Dec. 16, 1969   E. BETZ   3,484,331
FOAMED PLASTIC PLATE
Filed April 18, 1966
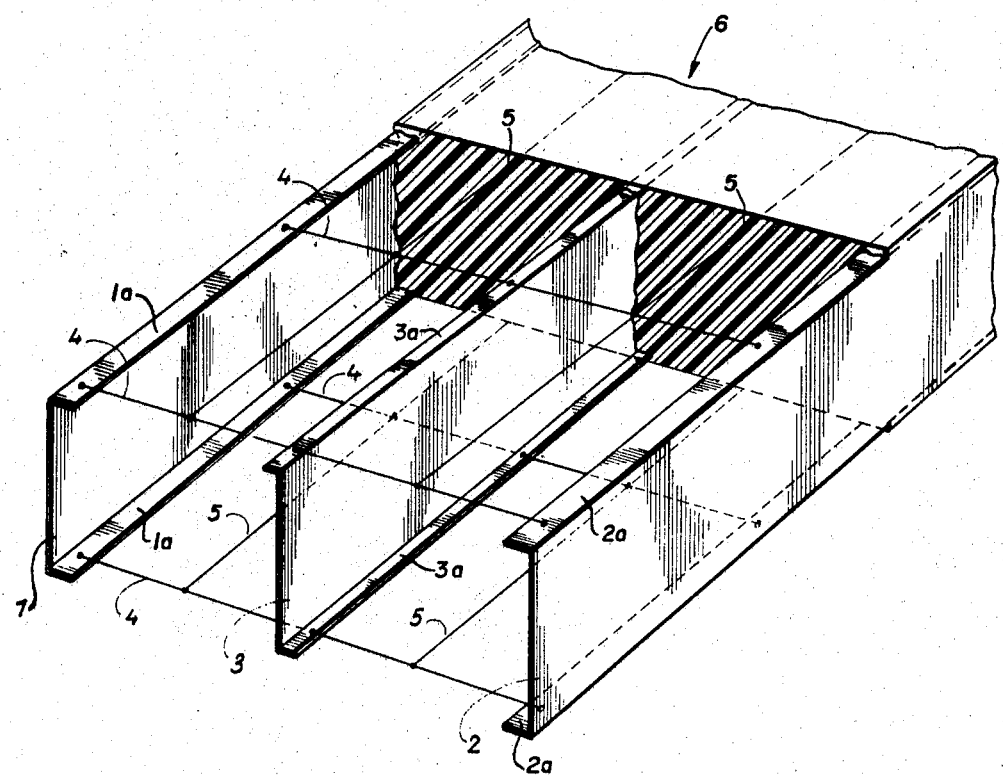
INVENTOR
Erich Betz
BY *Spencer & Kays*
ATTORNEYS

United States Patent Office 3,484,331
Patented Dec. 16, 1969

3,484,331
FOAMED PLASTIC PLATE
Erich Betz, Worms, Germany, assignor to Deutsche
Linoleum-Werke A.G., Bietigheim, Germany
Filed Apr. 18, 1966, Ser. No. 543,225
Claims priority, application Germany, June 9, 1965,
R 30,761
Int. Cl. B32b 3/26, 3/08
U.S. Cl. 161—69                                    7 Claims

ABSTRACT OF THE DISCLOSURE

A foamed plastic plate for use as a building panel includes a plurality of spaced-apart parallel sheet members, the sheet members having a plurality of flanges extending at right angles to their parallel portions, a plurality of spaced-apart wires extending transversely to the profiled sheet members and connected thereto to form a reinforcing framework, said flanges and wires being embedded in the foam plastic.

---

The present invention relates to a plate made of foamed plastic in which stiffening or reinforcing elements are embedded.

More particularly, the present invention relates to a foamed plastic plate which is formed in a continuous extrusion process and which has a high resistance to bending and a high carrying ability and is therefore particularly suited for use as a building material, for example, in ceilings, floors, and the like.

There already exists a continuous manufacturing process wherein foamed plastic plates are continuously extruded and wherein reinforcing elements are embedded into the mass being shaped. Generally, in such a manufacturing process, longitudinal reinforcing elements in the form of a webbing are introduced into the pressure channel which is bounded by circulating endless belts. However, difficulties have arisen in this type of manufacture in that the reinforcing elements hinder the pouring in of the granulate from which the foamed plastic is made, and also hinder an even distribution of the granulate throughout the entire width of the endless belt which forms the underside of the pressure channel, and it is, therefore, an object of the present invention to provide a foamed plastic plate which overcomes the above-mentioned disadvantages.

It is another object of the present invention to provide a foamed plastic plate having reinforcing elements embedded therein, and wherein, during the forming of such plate, the elements permit the introduction of the granulate and an even distribution thereof without hindrance, whereby such elements provide the plate with a high degree of stability.

In accordance with the present invention, a reinforcing framework is provided for foamed plastic plates, which framework includes reinforcing elements that extend in the longitudinal direction of the foamed plastic plate, i.e., in the direction in which the material to be formed is transported. The reinforcing elements are constituted by profiled sheet members which are arranged in an upright or "on-edge" manner and which are connected together by further reinforcing elements constituted by wires which extend in a transverse direction and which are connected to the profiled members.

According to a further feature of the present invention, in order that the profiled members and the wires be interconnected with each other to form a rigid structure, the vertically arranged profiled members are provided with horizontally bent flanges to which the transverse connecting wires are welded.

According to a preferred feature of the present invention, the vertically arranged profiled members extend essentially over the entire height of the foamed plastic plate so that they form a rigid connection between the wires which are arranged in the zone which, when the plate is subjected to bending forces, are subjected to pressure as well as tension forces.

Additional objects and advantages of the present invention will become apparent upon consideration of the following description when taken in conjunction with the accompanying drawing in which the single figure is a perspective view partly in cross-section, of a foamed plastic plate according to the present invention.

Referring now to the drawing, there is shown a plate incorporating a reinforcing framework according to the present invention. The framework comprises, a plurality of vertically arranged members in the form of metal sheets, with the two outer members 1 and 2 having a U-shaped cross-section due to the inwardly extending horizontal flanges 1a and 2a. The inner member 3—only one being shown, although in practice there may be more —is provided with Z-shaped profile, the horizontal flanges 3a of such member extending in opposite directions. The sheet members are connected together by wires 4 which are welded to these flanges. The wires 4 are additionally connected to each other by longitudinally extending wires 5 and thereby form a grid-like arrangement.

The thus prefabricated framework is introduced between the endless belts (not shown) which form the upper and lower side wall of the pressure channel in an extrusion process, with the framework being maintained slightly spaced from these belts. Therefore, not only are the interstices between the vertical members filled with foamed plastic, but a layer of plastic will also be formed on the flanges of the U-shaped members. The two outer vertically arranged profiled members 1 and 2 constitute the edges of the narrow sides of the foamed plastic plate 6 which may, for example, be polystyrene. In this way, by additionally profiling the outer members 1 and 2, lateral edge surfaces can be formed which allows a connection of closed or complementary configuration between two adjacent foamed plastic plates.

Thus, according to the present invention, by filling out and surrounding the afore-described reinforcing framework with extruded foamed material, there will be obtained plates which have an exceptionally high carrying ability and a high resistance to bending, and which, despite the reinforcements, are practically impermeable to sound and are therefore very well suited for use in ceilings and roofs of large dimensions.

It will thus be seen that, in accordance with the present invention, there is provided a foamed plastic plate having reinforcements embedded therein, wherein the reinforcements comprise a plurality of spaced-apart vertically arranged profiled sheet members extending in longitudinal direction of the foamed plastic plate, and a plurality of spaced-apart wires extending transversely to the profiled members, these wires being connected to the sheet members to form the reinforcing framework.

It will also be seen that the present invention resides in a framework per se, the same being an article of manufacture which finds use as a reinforcement to be embedded in a mass of foamed plastic material, which mass is ultimately intended to constitute the bulk of a reinforced foamed plastic plate.

What is claimed is:
1. A foamed plastic plate having reinforcements embedded therein wherein the reinforcements comprise a plurality of horizontally spaced-apart substantially parallel vertically arranged profiled sheet members extending in a longitudinal direction of the foamed plastic plate and having horizontal flanges formed at the upper and lower end of each sheet embedded in the plastic, and a plurality of embedded spaced-apart upper wires extending transversely to said profiled sheet members and connecting the upper flanges and a plurality of similar wires connecting the lower flanges thereby to form a reinforcing framework.

2. A plate as defined in claim 1 wherein said transverse connecting wires are welded to said flanges.

3. A plate as defined in claim 2 wherein said transversely extending wires are arranged in a zone which, upon bending of the plate is subjected to pressure as well as tension, said wires being rigidly connected to a plurality of vertically spaced flanges on each of a plurality of said profiled sheet members.

4. A plate as defined in claim 3, wherein said reinforcements further comprise longitudinally extending wires connected to said transversely extending wires.

5. A plate as defined in claim 1 wherein the two outer vertically arranged profiled sheet members constitute the edges of the plate.

6. A plate as defined in claim 5 wherein said two sheet members have inwardly directed flanges and are therefore of U-shaped cross section.

7. A plate as defined in claim 6 wherein the remainder of said sheet members have oppositely directed flanges and are therefore of Z-shaped cross section.

References Cited

UNITED STATES PATENTS

| | | | |
|---|---|---|---|
| 1,798,609 | 3/1931 | Knowlton | 161—161 X |
| 2,460,309 | 2/1949 | Rapp | 161—161 X |
| 3,305,991 | 2/1967 | Weismann | 264—45 X |
| 1,726,031 | 8/1929 | Lathrop | 52—601 |
| 3,303,076 | 2/1967 | Carlson et al. | 161—69 X |

ROBERT F. BURNETT, Primary Examiner

R. L. MAY, Assistant Examiner

U.S. Cl. X.R.

52—309; 161—100, 102, 161